United States Patent Office 3,385,856
Patented May 28, 1968

3,385,856
N-ARYL-SUBSTITUTED BICYCLIC AZACYCLES
Herbert Morton Blatter, Irvington, Richard William James Carney, Murray Hill, and George de Stevens, Woodland Park, Summit, N.J., assignors to Ciba Corporation, New York, N.Y., a corporation of Delaware
No Drawing. Continuation-in-part of application Ser. No. 455,315, May 12, 1965. This application Sept. 17, 1965, Ser. No. 488,264
6 Claims. (Cl. 260—251)

ABSTRACT OF THE DISCLOSURE 1-aryl-quinazolines of the formulae

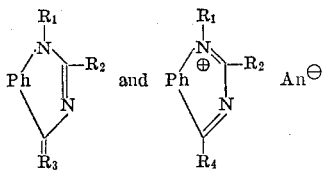

Ph = a 1,2-phenylene
$R_1$ = aromatic radical
$R_2$ = aliphatic or aromatic radical
$R_3$ = O, S or an imino group
$R_4$ = amino, etherified OH or SH or azacyclic arylidenemethyl
$An^\ominus$ = an anion are anti-inflammants, dyes or intermediates.

---

This application is a continuation-in-part of application Ser. No. 455,315, filed May 12, 1965, which in turn is a continuation-in-part of application Ser. No. 351,216, filed Mar. 11, 1964, now abandoned.

The present invention concerns and has for its object the provision of 1-aryl-quinazoline compounds and methods for their preparation.

More particularly it relates to compounds having the formulae

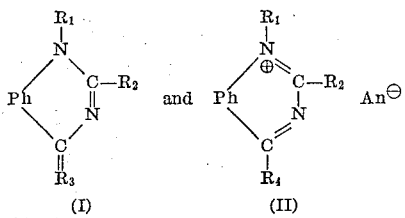

in which Ph stands for a 1,2-phenylene radical, $R_1$ for a carbocyclic aryl group, $R_2$ for an aliphatic radical or a carbocyclic aryl group, $R_3$ for an imino group, $R_4$ for an amino group, an aliphatically substituted hydroxy or mercapto group or an N-substituted azacyclic arylidenemethyl group in which the ring-nitrogen is part of an enamine grouping and $An^\ominus$ for the anion of an acid or the hydroxyl ion.

The 1,2-phenylene radical Ph may be unsubstituted or substituted by one or more than one of the same or different substituents attached to any of the positions available for substitution. Such substituents are, for example, lower alkyl, e.g. methyl, ethyl, n-propyl, or isopropyl, etherified hydroxy, such as lower alkoxy, e.g. methoxy, ethoxy, n-propoxy, isopropoxy or n-butoxy, esterified hydroxy, such as halogeno, e.g. fluoro, chloro or bromo, etherified mercapto, such as lower alkylmercapto, e.g. methyl or ethylmercapto, trifluoromethyl, nitro, amino, especially tertiary amino, such as di-lower alkylamino, e.g. dimethylamino or diethylamino, alkyleneimino in which alkylene has from four to six carbon atoms, e.g. pyrrolidino or piperidino. Preferred 1,2-phenylene radicals Ph are 1,2-phenylene, (lower alkyl)-1,2-phenylene, (lower alkoxy) - 1,2 - phenylene, (halogeno)-1,2-phenylene, (lower alkylmercapto) - 1,2 - phenylene, (trifluoromethyl) - 1,2 - phenylene, (nitro) - 1,2 - phenylene and (di-lower alkylamino)-1,2-phenylene.

Each of the carbocyclic aryl groups $R_1$ and $R_2$ particularly stands for monocyclic carbocyclic aryl, i.e. phenyl or substituted phenyl, as well as for bicyclic carbocyclic aryl, i.e. a naphthyl or a substituted naphthyl. Said substituted aryl groups may contain one or more than one of the same or different substituents attached to any position available for substitution, for example those mentioned for Ph. The aryl groups $R_1$ and $R_2$, therefore, are primarily phenyl, (lower alkyl)-phenyl, (lower alkoxy)-phenyl, (halogeno)-phenyl, (lower alkylmercapto)-phenyl, (trifluoromethyl)-phenyl, (nitro)-phenyl or (di-lower alkyl-amino)-phenyl, as well as naphthyl, e.g. 1-naphthyl or 2-naphthyl, (lower alkyl)-naphthyl, (lower alkoxy)-naphthyl, (halogeno)-naphthyl, (lower alkylmercapto)-naphthyl, (trifluoromethyl)-naphthyl, (nitro)-naphthyl or (di-lower alkyl-amino)-naphthyl.

An aliphatic radical $R_2$ represents especially lower alkyl, e.g. methyl, ethyl, n-propyl, isopropyl or n-butyl, as well as lower alkenyl, e.g. allyl, cycloalkyl or cycloalkyl-lower alkyl having from three to eight, especially from five to seven, ring-carbon atoms, e.g. cyclopropyl, cyclopentyl, cyclohexyl, cycloheptyl or cyclooctyl; cyclopropylmethyl, cyclopentylmethyl, 2 - cyclopentylethyl, cyclohexylmethyl, 1-cyclohexylethyl or cycloheptylmethyl, monocyclic carbocyclic aryl-lower alkyl, e.g. benzyl, 1-phenylethyl or 2-phenylethyl. The above radicals may contain additional substituents, especially in the aromatic portion, such as those mentioned for Ph, as well as oxo or thiono, or the aliphatic radicals may be interrupted by hetero atoms, preferably by one oxygen, sulfur and/or nitrogen atom. Such radicals are, for example, lower alkoxy-lower alkyl groups, such as methoxymethyl, ethoxymethyl, n-propoxymethyl, 1- or 2-methoxyethoxy or i-propoxy-ethyl, 1-, 2- or 3-methoxy-, ethoxy or n-propoxy-propyl or 4-tert. butoxy-butyl, the corresponding phenoxy-lower alkyl and lower alkylmercapto-lower alkyl groups, mono- or di-lower alkylamino-lower alkyl, alkyleneimino-lower alkyl or aza-, oxa- or thia-alkyleneimino-lower alkyl or N-phenyl-aza-alkyleneimino-lower alkyl groups with 4 to 6 ring-carbon atoms and in which latter the hetero-atom is preferably separated from the ring-nitrogen atom by at least two carbon atoms, such as 2-methylamino-, 2-dimethylamino- or 2-diethylaminoethyl, 3-dimethylamino- or 3-diethylamino-propyl, 2-pyrrolidino-ethyl, 3-piperidino-propyl, 2-piperazino-ethyl, 2-(4-methyl-piperazino)-ethyl, 3-(4-ethyl-piperazino)- propyl, 2-(4-phenyl-piperazino)-ethyl, 2-morpholino-ethyl or 3-thiamorpholino-propyl.

The imino group $R_3$ can be unsubstituted, but preferably is substituted by the aliphatic or aromatic radicals mentioned for $R_2$; furthermore by hydroxy, lower alkoxy, such as that mentioned above, hydroxy-lower alkyl, such as 2-hydroxy ethyl, 2- or 3-hydroxy-propyl or 2,3-dihydroxy-propyl, carboxy-lower alkyl or carbo-lower alkoxy-lower alkyl, such as carboxy-methyl, 2-carboxy-ethyl, carbethoxymethyl or 3-carbomethoxy-propyl, or heterocyclic aryl, such as pyridyl, e.g. 2-, 3- or 4-pyridyl, thienyl, e.g. 2-thienyl or furyl e.g. 3-furyl.

An amino group $R_4$ may also be unsubstituted or substituted as shown for $R_3$. It preferably contains besides hydrogen or lower alkyl one of the aliphatic or aromatic radicals mentioned as substituents of the imino group $R_3$.

An aliphatically substituted hydroxy- or mercapto group $R_4$ is especially lower alkoxy or lower alkylmercapto, but may also be a hydroxy or mercapto group containing those aliphatic radicals shown for $R_2$.

The azacyclic arylidenemethyl group $R_4$ has, for example, the formula

in which $R_5$ is above all hydrogen, but may also stand for one of the radicals listed for $R_2$ and Q stands for an N-substituted mono- or polycyclic, especially bicyclic, azacyclic arylidene radical, such as a 1-substituted 2- or 4-pyridylidene or 2- or 4-quinolylidene radical, a 2-substituted 1-isoquinolylidene radical, a 3-substituted 2-thiazolylidene, 2-benzthiazolylidene, 2-oxazolylidene or 2-benzoxazolylidene radical or a 1,3,3-tri-substituted 2-indolylidene radical in which the ring-nitrogen is part of an enamine grouping. In the above azacyclic radicals representing Q, the substituent of the ring-nitrogen atom is above all an aliphatic radical, e.g. lower alkyl, as well as lower alkyl substituted by any of the previously mentioned substituents, or an araliphatic radical, such as monocyclic carbocyclic aryl-loweralkyl, as well as an aryl radical, for example, one of those radicals representing $R_2$. Apart from the group substituting the ring-nitrogen atom, the azacyclic ring is unsubstituted or may have one or more than one additional substituent such as lower alkyl, etherified hydroxy, e.g. lower alkoxy, esterified hydroxy, e.g. halogeno, etherified mercapto, e.g. lower alkylmercapto, trifluoromethyl, nitro and tertiary amino, e.g. di-lower alkylamino, of the meaning given above.

An ion $An^{\ominus}$ is above all the anion of an acid, primarily the anion of an inorganic acid, especially of a hydrohalic acid, e.g. hydrochloric, hydrobromic or hydriodic acid or of sulfuric, thiocyanic or perchloric acid as well as the anion of an organic acid, such as a carboxylic acid or sulfonic acid, e.g. acetic, oxalic, maleic, hydroxymaleic, fumaric, malic, tartaric, citric, benzoic or salicylic acid, or more especially of methane sulfonic, ethane sulfonic, 2-hydroxy-ethane sulfonic, 1,2-ethane disulfonic, benzene sulfonic, p-toluene sulfonic or 2-naphthalene sulfonic acid, or of a monobasic organic sulfuric acid, such as a lower alkyl-sulfuric acid, e.g. methyl or ethyl-sulfuric acid, as well as the anion of an acidic organic nitro compound, e.g. picric, picrolonic or flavianic acid, or of a metal complex acid, e.g. phosphotungstic, phosphomolybdic, chloroplatinic or Reinecke acid. In the event that the compounds of this invention are used for pharmaceutical purposes, the anion $An^{\ominus}$ is that of a pharmaceutically acceptable acid.

The compounds of this invention have valuable pharmacological properties. For example, they exhibit antimicrobial effects, such as against gram-positive bacteria, e.g. *Diplococcus pneumoniae*, *Staphylococcus aureus* and the like, against gram-negative bacteria, e.g. *Escherichia coli*, *Pseudomonas aeruginosa*, *Salmonella choleraesuis* and the like, against acid-fast bacteria, e.g. *Microbacterium tuberculosis* and the like, against fungi, e.g. *Candida albicans*, *Cryptococcus neoformans*, *Histoplasma capsulatum*, *Trichophyton mentagrophytes* and the like, as well as against protozoa, e.g. *Trichomonas vaginalis* and the like. They are, therefore, useful as antimicrobial agents, either topically or systemically, against bacterial, fungal or protozoal infections. They also show activities against helminths, such as *Nippostrongylus muris* and the like, and are, therefore, useful as anthelmintic agents. Furthermore they exhibit anti-inflammatory effects, especially those compounds of Formulae I and II in which $R_3$ and $R_4$ stand for an imino or amino group respectively. This can be demonstrated, for example, in the granuloma pouch test or the carrageenin rat paw test, at oral doses between about 5 and 50 mg./kg./day, preferably between about 10 and 25 mg./kg./day. They are, therefore useful as anti-inflammatory agents, preferably for oral application, in place of corticosteroids, such as cortisone or hydrocortisone, in the treatment of tissue inflammations, such as arthritic inflammations and similar conditions.

The compounds of Formula II in which $R_4$ represents an N-substituted azacyclic arylidenemethyl group, are cyanine dyes containing at least two auxochromic nitrogen atoms, one being of tertiary, the other of quaternary characteristics. One of these nitrogen atoms is the ring member of one heterocyclic ring system, the second of another heterocyclic ring system, and both are linked with each other through a conjugated chain of double bonds. These dyes are also excellent sensitizers of photographic emulsions without causing excessive fog or residual dye stain.

Particularly useful are compounds of the formulae

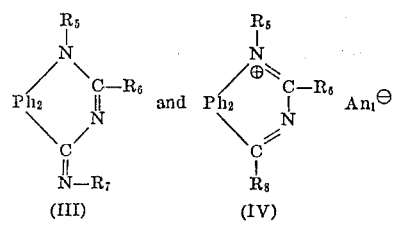

in which $Ph_2$ stands for 1,2-phenylene, (lower alkyl)-1,2-phenylene, (lower alkoxy)-1,2-phenylene, (halogeno)-1,2-phenylene, (lower alkylmercapto)-1,2-phenylene or (nitro)-1,2-phenylene, $R_5$ for phenyl, (lower alkyl)-phenyl, (lower alkoxy)-phenyl, (halogeno)-phenyl, (lower alkylmercapto)-phenyl or (nitro)-phenyl, $R_6$ for lower alkyl, phenyl, (lower alkyl)-phenyl, (lower alkoxy)-phenyl, (halogeno)-phenyl, (lower alkylmercapto)-phenyl or (nitro)-phenyl, $R_7$ for hydrogen, lower alkyl, amino-lower alkyl, mono- or di-lower alkylamino-lower alkyl, alkyleneimino-lower alkyl in which alkylene has from four to six carbon atoms, aza-, oxa- or thiaalkyleneimino-lower alkyl in which the heteroatom is separated from the ring-nitrogen by at least two carbon atoms and the ring has from four to six carbon atoms, carboxy-lower alkyl or carbo-lower alkoxy-lower alkyl, $R_8$ for lower alkylmercapto, di-lower alkylamino or an at most bicyclic N-lower alkyl-azacyclic, -thiazacyclic or -oxazacyclic arylidenemethyl group in which the ring-nitrogen is part of an enamine grouping and $An^{\ominus}$ for a halogenide ion.

Especially valuable are those compounds of the Formulae III and IV in which $Ph_2$ stands for 1,2-phenylene, $R_5$ for phenyl, (lower alkyl)-phenyl, (lower alkoxy)-phenyl or (halogeno)-phenyl, $R_6$ for lower alkyl, phenyl, (lower alkyl)-phenyl, (lower alkoxy)-phenyl or (halogeno)-phenyl, $R_7$ for lower alkyl, $R_8$ for lower alkylmercapto, di-lower alkylamino, 1-lower alkyl-2-quinolylidenemethyl, 3-lower alkyl-2-benzthiazolylidenemethyl or 3-lower alkyl-2-benzoxazolylidenemethyl and $An^{\ominus}$ for a halogenide ion.

The compounds of this invention are prepared according to known methods. For example, the process for their preparation comprises the method, wherein (a) A 1-aryl-4-oxo or thiono-quinazoline, more particular a compound of the formula

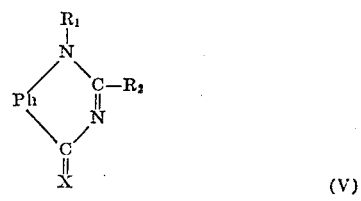

(V)

in which X stands for an oxo or thiono group, is reacted with ammonia, a primary amine or a reactive ester of an aliphatic alcohol, or (b) A 1-aryl-5,6,7,8-tetrahydro-quinazoline, more particularly a compound of the formulae

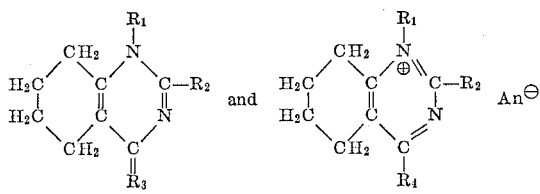

is dehydrogenated and, if desired, a reaction product obtained from the reactive ester, is treated with ammonia, an amine containing at least one hydrogen atom or a quaternary N-substituted azacyclic arylmethyl compound of which the methyl group contains at least two hydrogen atoms and the ring-nitrogen is capable of forming an enamine grouping and/or a product obtained, containing a free or mono-substituted imino or amino group respectively, is reacted with a reactive ester of an aliphatic or aromatic alcohol and/or in a quaternary compound obtained, the anion is converted into the hydroxyl ion or another anion.

A reactive ester of the aliphatic alcohol, for example, is an ester with an inorganic acid, particularly a hydro halic acid, e.g. hydrochloric, hydrobromic or hydriodic acid, as well as sulfuric acid, or with a strong organic sulfonic acid, e.g. methane sulfonic, 2-hydroxyethane sulfonic or p-toluene sulfonic acid. Preferred reactive esters of the aliphatic alcohol are those with hydrohalic acids having a molecular weight greater than 20.

The quaternary arylmethyl compound more particularly is that of the formula $[Q_1—CH_2—R_5]^{\oplus}An^{\ominus}$ in which $Q_1$ stands for a quaternary N-substituted azacyclic aryl radical capable of furnishing the group Q. $Q_1$ more particularly represents a quaternary 2- or 4-pyridyl, 2- or 4-quinolyl, 1-isoquinolyl, 2-thiazolyl, 2-benzothiazolyl, 2-oxazolyl, 2-benzoxazolyl or 3,3-disubstituted 2-indolenyl radical in which the group attached to the quaternary nitrogen atom is above all lower alkyl, whereas $R_5$ has the previously given meaning, but represents primarily hydrogen, and $An^{\ominus}$ is above all a halogenide ion.

The above reactions are carried out in the usual manner by combining the reactants of the absence or advantageously in the presence of a diluent, preferably such that is inert to the reactants and is a solvent thereof, in the presence or absence of a catalyst, condensing or neutralizing agent, while cooling at room temperature or advantageously at elevated temperatures, under atmospheric or super-atmospheric pressure and/or in the atmosphere of an inert gas, e.g., nitrogen.

A neutralizing agent is preferably used in the reaction with the reactive esters and quaternary arylmethyl compounds. Such agent is, for example, an alkali or alkaline earth metal carbonate or lower alkoxide, or more especially, an organic base such as pyridine or collidine, but particularly an aliphatic tertiary amine, such as a tri-lower alkylamine, a tetra-lower alkyl-alkylenediamine, an N-lower alkyl-alkyleneimine, an N-lower alkyl-morpholine or a mixture thereof, such as a mixture of pyridine and triethylamine.

The dehydrogenation according to method (b) is carried out in the usual manner either catalytically, e.g. with the use of palladium, platinum and nickel catalysts, chromium oxide and chromia-alumina catalysts, or by means of dehydrogenation agents, such as sulfur, selenium, oxide, isoamyl disulfide and chloranil.

In a resulting quaternary compound the anion may be converted into another anion according to known methods. Thus, the anion of an acid may be replaced by the hydroxyl ion, for example, by reacting a resulting quaternary halide with silver oxide, or a quaternary sulfate with barium hydroxide, by treating a quaternary salt with an anion exchange preparation or by electrodialysis. From any resulting quaternary hydroxide, there may be obtained quaternary salts by reacting the quaternary base with an acid, for example, one of those mentioned hereinbefore. A resulting quaternary salt may also be converted directly into another quaternary salt without the formation of an intermediate quaternary hydroxide. For example, a quaternary iodide may be reacted with freshly prepared silver chloride or with hydrochloric acid in anhydrous methanol to yield the quaternary ammonium chloride; a quaternary salt may also be converted into another quaternary salt by treatment with an anion exchange preparation. Quaternary ammonium compounds may also crystallize as the hydrates.

The starting material mentioned under item (b) is disclosed in copending application Ser. No. 488,241, filed concurrently with the present application. That of Formula V, in which X stands for thiono, as well as the acid addition salts thereof, for example, those with the previously mentioned acids, is new and is intended to be included within the scope of this invention. It is prepared, for example, from the corresponding 4-oxo-compound by treatment with phosphorus pentasulfide in the presence of a high-boiling solvent, e.g. xylene.

The starting material of Formula V, in which X stands for oxo can be obtained according to methods known per se, for example, by (a) Reacting a compound of the formula

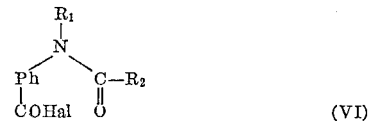

in which Hal stands for a halogen atom, with ammonia or an ammonia-furnishing reagent, or (b) Subjecting a compound having one of the formulae

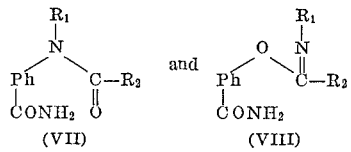

to an elevated temperature.

The acid halide of the Formula VI can be obtained by treating the acid $R_1$—NH—Ph—COOH with a reactive functional derivative of the acid $R_2$—COOH, such as a halide, e.g. the chloride or the anhydride thereof, and treating the acid obtained with a thionyl halide, e.g. thionyl chloride, a phosphoric acid halide, e.g. phosphorus tribromide, phosphorus pentachloride or phosphorus oxychloride.

The acid amide of the Formula VII, which is formed in reaction (a) as an intermediate, can be obtained by reaction of the acid amide $R_1$—NH—Ph—CONH$_2$ with a reactive functional derivative of the acid $R_2$—COOH.

The acid amide of the Formula VIII may be obtained by reaction of the acid amide HO—Ph—CONH$_2$ with the imidoyl halide

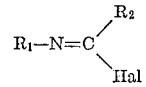

wherein $R_2$ preferably is a carbocyclic aryl group, in the presence of an alkali metal lower alkoxide.

The present invention also comprises any modification of the process, wherein a compound obtainable as an intermediate at any stage thereof is used as starting material and any remaining steps are carried out, or the process is discontinued at any stage thereof, or in which the starting materials are formed under the reaction conditions or are used in the form of their salts.

Mainly those starting materials should be used in the present process that lead to the formation of those compounds indicated above as being especially valuable.

The compounds of this invention are useful in the form of compositions for enteral, parenteral or topical administration, which contain a pharmacologically effective amount of the compounds of this invention in admixture with a pharmaceutically acceptable, organic or inorganic, solid or liquid carrier, which usually represents the major portion of the pharmaceutical composition. For making up the latter, there are employed carrier materials suitable for the preparation of pharmaceutical compositions, such as water, gelatine, sugars, e.g. lactose, glucose or sucrose, starches, e.g. corn starch, wheat starch or rice starch, stearic acid or salts thereof, e.g. calcium or magnesium stearate, talc, vegetable oils, alcohol, e.g. ethanol, benzyl alcohol or cetyl alcohol, petrolatum, gums, acacia, propylene glycol, polyalkylene glycols or any other known carrier for pharmaceutical compositions. The pharmaceutical preparations may be in solid form, e.g. capsules, tablets or dragées, in liquid form, e.g. solutions or suspensions, or in the form of emulsions, e.g. salves or creams. If desired, they may contain auxiliary substances, such as preserving, stabilizing, wetting, emulsifying, or coloring agents, salts for varying the osmotic pressure or buffers. The above preparations are prepared according to standard methods used for the manufacture of pharmaceutically acceptable compositions, which, if desired, also contain, in combination, other physiologically useful substances.

In order to be used as cyanine dyes in the sensitization of photographic silver halide emulsions, the arylidenemethyl compounds of this invention are dispersed in the emulsions, such as gelatino-silver halide emulsions, e.g. gelatino-silver bromide, gelatino-silver bromoiodide, gelatino-silver chloride or gelatino-silver chloroiodide. The methods of incorporating these dyes in emulsions are conventional and are described in the art.

The following examples are intended to illustrate the invention and are not to be construed as being limitations thereon. Temperatures are given in degrees centigrade and all parts wherever given are parts by weight.

Example 1

A mixture of 8.75 g. of 1-(4-fluoro-phenyl)-2-phenyl-1,4-dihydro-quinazoline-4-thione and 15 ml. of methyl iodide is refluxed for 1½ hours. The solid 1-(4-fluoro-phenyl) - 4 - methyl - mercapto - 2 - phenyl - quinazolinium iodide of the formula

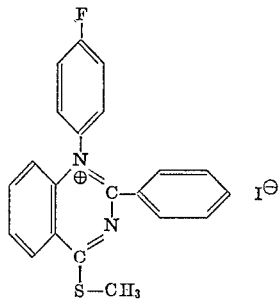

is filtered off, yield: 11.0 g., and recrystallized from acetone, M.P. 270–290° (with decomposition).

The starting material used in the above procedure is prepared as follows: To a mixture of 33.3 g. of 4-fluoro-aniline in 100 ml. of pyridine is added slowly 42.1 g. of benzoyl chloride while cooling. The reaction mixture is poured into 600 ml. of water and the benzoyl N-(4-fluoro-phenyl)-amide is filtered off, washed with water and recrystallized from ethanol, M.P. 183–187°.

A mixture of 46.0 g. of benzoyl N-(4-fluoro-phenyl)-amide and 100 ml. of thionyl chloride is refluxed for three hours. The excess of thionyl chloride is distilled off, and the desired N-(4-fluoro-phenyl)-benzimidoyl chloride is purified by distillation and collected at 180°/20 mm.

To a cold solution of 1.35 g. of sodium methoxide in 50 ml. of ethanol is added in rapid succession 4.56 g. of methyl salicylate and a solution of 4.66 g. of N-(4-fluoro-phenyl)-benzimidoyl chloride in 25 ml. of diethyl ether. The reaction mixture is allowed to stand at room temperature for thirty minutes and is then evaporated. The residue is washed with water, filtered off and recrystallized from ethanol to yield the carbomethoxy-phenyl N-(4-fluoro-phenyl)-benzimidoate, which melts at 126–130°.

A total of 85.0 g. of 2-carbomethoxy-phenyl N-(4-fluoro-phenyl)-benzimidoate is heated at 275° for ten minutes. After cooling, diethyl ether is added, and the methyl N-benzoyl-N-(4-fluoro-phenyl)-anthranilate is filtered off and recrystallized from methanol, M.P. 110–116°.

To 34.9 g. of methyl N-benzoyl-N-(4-fluoro-phenyl)-anthranilate in 200 ml. of ethanol is added 110 ml. of water, and 110 ml. of a solution consisting of 5.4 g. of sodium methoxide, 100 ml. of ethanol and 20 ml. of water. The reaction mixture is refluxed for 1½ hours and then concentrated. The aqueous mixture is acidified with concentrated hydrochloric acid and is then extracted with methylene chloride. The organic solvent is evaporated, the residue is extracted with an aqueous solution of sodium hydrogen carbonate, and the aqueous extract is acidified with hydrochloric acid. The precipitate is filtered off, and dissolved in methylene chloride; the organic solution is dried over sodium sulfate and diluted with hexane. The desired N-benzoyl-N-(4-fluoro-phenyl)-anthranilic acid precipitates and is recrystallized from diethyl ether, M.P. 176–178°.

A mixture of 20.0 g. of N-benzoyl-N-(4-fluoro-phenyl)-anthranilic acid and 100 ml. of phosphorus oxychloride is refluxed for nineteen hours. The excess of phosphorus oxychloride is distilled and the residue is taken up into approximately 200 ml. of methylene chloride. The resulting solution of the N-benzoyl-N-(4-fluoro-phenyl)-anthranilic acid chloride is treated for one hour with gaseous ammonia until the reaction mixture has become basic. It is then washed with water, dried over sodium sulfate and concentrated. 8.3 g. of a white precipitate is filtered off, and is combined with 6.0 g. of additional material obtained by diluting the mother liquors with hexane. The desired 1-(4-fluoro-phenyl)-2-phenyl-3,4-dihydro-quinazolin-4-one melts at 289–290° after recrystallization from acetone and hexane.

A mixture of 10.5 g. of 1-(4-fluoro-phenyl)-2-phenyl-1,4-dihydro-quinazolin-4-one and 8.9 g. of phosphorus pentasulfide in 150 ml. of xylene is refluxed for two hours while stirring. After cooling, 60 ml. of a ten percent aqueous solution of sodium hydroxide is added; the precipitate is filtered off, washed with hot ethanol and recrystallized from acetone, using a charcoal preparation for clearing the solution. The desired 1-(4-fluoro-phenyl)-2-phenyl-1,4-dihydro-quinazolin-4-thione of the formula

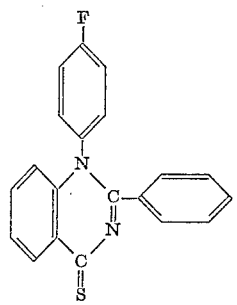

melts at 293–296°; yield: 5.7 g.

Example 2

A mixture of 8.5 g. of 1,2-diphenyl-1,4-dihydro-quinazolin-4-thione and 15 ml. of methyl iodide is refluxed for two hours. The desired 1,2-diphenyl-4-methylmercapto-quinazolinium iodide of the formula

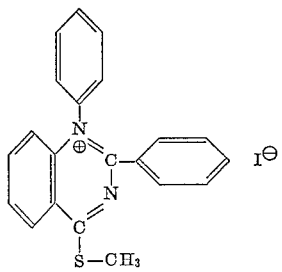

is filtered off and recrystallized from acetone.

The starting material used in the above procedure is prepared as follows: To a cold solution of 1.35 g. of sodium methoxide in 25 ml. of absolute ethanol is added rapidly a solution of 4.1 g. of salicylic acid amide in 25 ml. of absolute ethanol and then 4.3 g. of N-phenyl-benzimidoyl chloride in 25 ml. of anhydrous diethyl ether. The reaction mixture is allowed to stand at room temperature for 1½ hours, and is then concentrated to a small volume, and diluted with water. Upon cooling and scratching, the yellow oil solidifies, and is filtered off and dissolved in diethylether; the organic solution is dried over sodium sulfate and evaporated. The resulting 2-carbamyl-phenyl N-phenyl-benzimidoate is crystallized from a mixture of diethyl ether and pentane, and melts at 136–138° from a mixture of acetone and hexane.

A mixture of 2.0 g. of 2-carbamyl-phenyl-N-phenyl-benzimidoate in 200 ml. of diphenyl ether is refluxed for two hours in a Soxhlet apparatus containing anhydrous sodium sulfate in the thimble. The solution is then concentrated to dryness under reduced pressure; upon adding diethyl ether to the residue, the 1,2-diphenyl-1,4-dihydro-quinazolin-4-one is obtained, M.P. 265–273°.

The above 1,2-diphenyl-1,4-dihydro-quinazolin-4-one is also prepared as follows: To a suspension of 17.4 g. of N-phenyl-anthranilic acid in 250 ml. of pentane is added in portions 16.8 g. of phosphorus oxychloride. After standing at room temperature for one hour and filtering, the filtrate is concentrated under reduced pressure, decolorized with a charcoal preparation and frozen in a mixture of solid carbon dioxide and acetone. The solid N-phenyl-anthranilic acid chloride is filtered off and rapidly added to 250 ml. of a cold concentrated solution of ammonia in water. The reaction mixture is allowed to stand at room temperature for three hours; the N-phenyl-anthranilic acid amide is filtered off, crystallized from diethyl ether and recrystallized from the same solvent, M.P. 129–131°.

To a solution of 0.212 g. of N-phenyl-anthranilic acid amide in 2 ml. of pyridine is added 0.14 g. of benzoyl chloride; the reaction mixture is allowed to stand for twenty minutes at room temperature and is then poured into water. The oily material is extracted with methylene chloride, the organic solution is filtered through anhydrous sodium sulfate and is evaporated to dryness. The residue solidifies in diethyl ether and is filtered off to yield the N-benzoyl-N-phenyl-anthranilic acid amide, M.P. 235–237°, after two recrystallizations from ethanol.

Upon heating to approximately 300° the N-benzoyl-N-phenyl anthranilic acid amide melts; the product is cooled and recrystallized from ethanol to yield the desired 1,2-diphenyl-1,4-dihydro-quinazolin-4-one.

The latter is also obtained as follows: A mixture of 13.0 g. of N-benzoyl-N-phenyl-anthranilic acid and 325 ml. of phosphorus oxychloride is refluxed for nineteen hours. The excess of phosphorus oxychloride is evaporated, and the resulting N-benzoyl-N-phenyl-anthranilic acid chloride is dissolved in methylene chloride. Gaseous ammonia is bubbled through the solution for fifteen minutes, which is then allowed to stand at room temperature for one hour. After washing it with water, the organic solution is dried over sodium sulfate, decolorized with a charcoal preparation and concentrated. Upon dilution with hexane, a precipitate is formed, consisting of N-benzoyl-N-phenyl-anthranilic acid amide and 1,2-diphenyl-1,4-dihydro-quinazolin-4-one. The latter is obtained by heating the mixture to 300° and cooling it to room temperature. The desired 1,2-diphenyl-1,4-dihydro-quinazolin-4-one melts at 273–275.5° after recrystallization from ethanol.

A mixture of 3.5 g. of 1,2-diphenyl-1,4-dihydro-quinazolin-4-one and 3.13 g. of phosphorus pentasulfide in 35 ml. of xylene is refluxed for two hours while stirring. After cooling, 21 ml. of a 10 percent aqueous solution of sodium hydroxide is added, and the reaction mixture is stirred for fifteen minutes. The solid material is filtered off, washed with hot ethanol and recrystallized from N,N-dimethylformamide to yield the desired 1,2-diphenyl-1,4-dihydro-quinazolin-4-thione of the formula

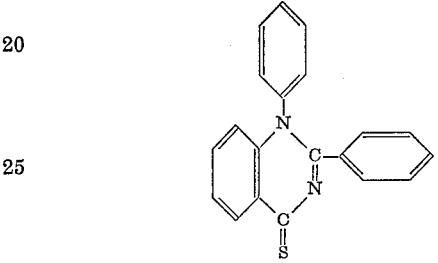

M.P. 305–307°.

Example 3

A mixture of 4.3 g. of 2-methyl-1-phenyl-quinazolin-4-thione and 10 ml. of methyl iodide, when reacted as described in Example 1, yields the 2-methyl-4-methylmercapto-1-phenyl-quinazolinium iodide of the formula

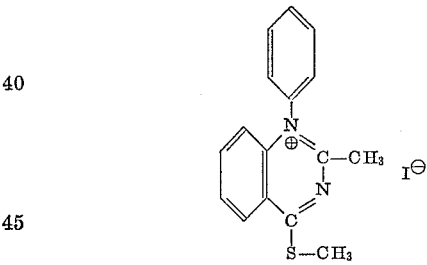

which is purified by recrystallization from acetone.

The starting material used in the above procedure is prepared as follows: A mixture of 10.6 g. of N-phenyl-anthranilic acid amide and 5.1 g. of acetic acid anhydride is refluxed for seventeen hours. The acetic acid anhydride is evaporated under reduced pressure, and the residue is diluted with acetone. Upon seeding with an original sample, the 2-methyl-1-phenyl-1,4-dihydro-quinazolin-4-one precipitates and is filtered off; it melts at 231–233° after recrystallization from acetone.

Upon treatment of 2.0 g. of 2-methyl-1-phenyl-1,4-dihydro-quinazolin-4-one with 1.8 g. of phosphorus pentasulfide in the presence of xylene according to the procedure described in Example 2, the 2-methyl-1-phenyl-1,4-dihydro-quinazolin-4-thione of the formula

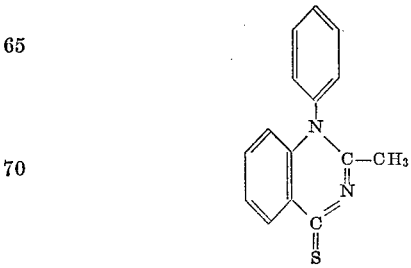

is formed.

Example 4

A mixture of 2.5 g. of 1-(4-methoxy-phenyl)-2-phenyl-1,4-dihydro-quinazolin-4-thione and 5 ml. of methyl iodide, when reacted as described in Example 1, yields the 1-(4-methoxy-phenyl)-4-methylmercapto-2-phenyl-quinazolinium iodide of the formula

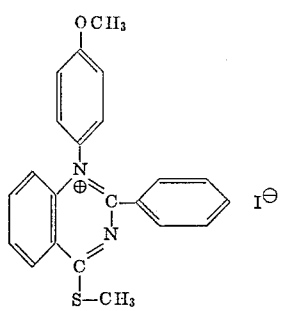

which is recrystallized from acetone.

The starting material used in the above procedure is prepared as described in Example 1, i.e. by reacting methyl salicylate with N-(4-methoxy-phenyl)-benzimidoyl chloride in the presence of sodium methoxide, heating the resulting 2-carbomethoxy-phenyl N-(4-methoxy-phenyl)-benzimidoate (M.P. 115–117°, after recrystallization from ethanol) at 275°, hydrolyzing the methyl N - benzoyl - N-(4-methoxy-phenyl)-anthranilate (M.P. 151–153°, after recrystallization from a mixture of acetone and hexane) with sodium hydroxide in aqueous ethanol, converting the N-benzoyl-N-(4-methoxy-phenyl)-anthranilic acid (M.P. 184–187°, after recrystallization from a mixture of acetone and hexane) into its amide, by treating the acid chloride with ammonia, heating the N - benzoyl - N-(4-methoxy-phenyl)-anthranilic acid amide, contaminated with 1-(4-methoxy-phenyl)-2-phenyl-1,4-dihydro-quinazolin-4-one, to 300°, and reacting the 1-(4-methoxy-phenyl)-2-phenyl-1,4-dihydroquinazolin-4-one (M.P. 240–243°, after recrystallization from ethanol) with phosphorus pentasulfide.

Example 5

Other 2-substituted 1-aryl-4-substituted mercapto-quinazolinium compounds prepared according to the previously-described and illustrated procedure by selecting the appropriate starting materials, are, for example,

| 1,4-dihydro-quinazolin-4-thione starting material | Quaternizing reagent | 4-substituted mercaptoquinazolinium products |
|---|---|---|
| 2-methyl-1-phenyl-1,4-dihydro-quinazolin-4-thione. | Methyl iodide | 2-methyl-4-methylmercapto-1-phenyl-quinazolinium iodide. |
| 2-ethyl-1-(4-methyl-phenyl)-1(4-dihydro-quinazolin-4-thione. | ___do___ | 2-ethyl-4-methylmercapto-1-(4-methyl-phenyl)-quinazolinium iodide. |
| 2-benzyl-1-(3-trifluoromethylphenyl)-1,4-dihydro-quinazolin-4-thione. | ___do___ | 2-benzyl-4-methylmercapto-1-(3-trifluoromethyl-phenyl)-quinazolinium iodide. |
| 1,2-diphenyl-6-methoxy-1,4-dihydroquinazolin-4-thione. | Ethyl iodide | 4-ethylmercapto-1,2-diphenyl-6-methoxyquinazolinium iodide. |
| 1,2-diphenyl-6-methyl,14-dihydroquinazolin-4-thione. | Methyl iodide | 1,2-diphenyl-6-methyl-4-methylmercapto-quinazolinium iodide. |
| 6-chloro-1,2-diphenyl-1,4-dihydro-quinazolin-4-thione | ___do___ | 6-chloro-1,2-diphenyl-4-methylmercapto-quinazolinium iodide. |
| 1-(3,4-dichlorophenyl)-2-(4-methyl-phenyl)-1,4-dihydro-quinazolin-4-thione. | ___do___ | 1-(3,4-dichloro-phenyl)-4-methylmercapto-2-(4-methyl-phenyl-quinazolinium iodide. |
| 1-(4-bromo-phenyl)-2-isopropyl-1,4-dihydro-quinazolin-4-thione. | Benzyl bromide | 4-benzylmercapto-1-(4-bromo-phenyl)-2-isopropyl-quinazolinium bromide (converted into the corresponding iodide by treatment with an excess of sodium iodide. |
| 2-(3-nitro-phenyl)-1-phenyl-1,4-dihydro-quinazolin-4-thione. | Methyl iodide | 4-methylmercapto-2-(3-nitro-phenyl)-1-phenyl-quinazolinium iodide. |
| 2-(4-bromo-phenyl)-1-phenyl-1,4-dihydro-quinazolin-4-thione. | ___do___ | 2-(4-bromo-phenyl)-4-methylmercapto-1-phenyl-quinazolinium iodide. |
| 2-(4-methyl-phenyl)-1-phenyl-1,4-dihydro-quinazolin-4-thione. | ___do___ | 4-methylmercapto-2-(4-methyl-phenyl)-1-phenyl-quinazolinium iodide. |
| 2-(4-methoxy-phenyl)-1-(2-naphthyl)-1,4-dihydro-quinazolin-4-thione. | ___do___ | 2-(4-methoxy-phenyl)-4-methylmercapto-1-(2-naphthyl)-quinazolinium iodide. |
| 2-(4-methylmercaptophenyl)-1-phenyl-1,4-dihydro-quinazolin-4-thione. | Ethyl iodide | 4-ethylmercapto-2-(4-methylmercapto-phenyl)-1-phenyl-quinazolinium iodide. |
| 1-(4-chloro-phenyl)-2-phenyl-1,4-dihydro-quinazolin-4-thione. | Methyl iodide | 1-(4-chloro-phenyl)-4-methylmercapto-2-phenyl-quinazolinium iodide. |

Example 6

To a mixture of 1.0 g. of 1-(4-fluoro-phenyl)-4-methylmercapto-2-phenyl-quinazolinium iodide and 0.63 g. of 2-quinaldine ethidide in 15 ml. of ethanol is added 1 ml. of N,N,N-triethylamine. The reaction mixture is refluxed for three hours and is then cooled to yield 1.1 g. of 4 - (1-ethyl-2-quinolylidene-methyl)-1-(4-fluoro-phenyl)-2-phenyl-quinazolinium iodide of the formula

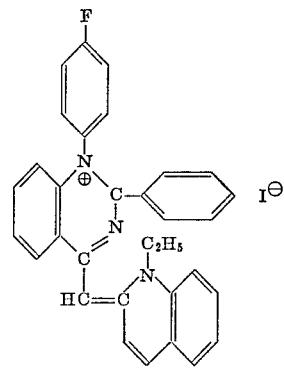

which melts at 305–306.5° after recrystallization from ethanol.

Example 7

Other 4-azaarylidenemethyl-1-aryl-quinazolinium compounds prepared according to the previously described and illustrated procedure by selecting the appropriate starting materials, are, for example

| 4-substituted mercapto quinazolinium compounds | Azaheterocyclic aryl quaternary compounds | 4-azaarylidenemethylquinazolinium product |
|---|---|---|
| 1,2-diphenyl-4-methylmercaptoquinazolinium iodide. | 2-methylbenzothiazole methiodide | 1,2-diphenyl-4-(3-methyl-2-benzothiazolylidene-methyl)-quinazolinium iodide. |
| Do | 2-quinaldine iodide | 1,2-diphenyl-4-(1-ethyl-2-quinolylidene-methyl)-quinazolinium iodide. |
| Do | 6-N,N-diethylamino-2-quinaldine methiodide | 4-(6-N,N-diethylamino-1-methyl-2-quinolylidenemethyl)-1,2-diphenylquinazolinium iodide. |
| 1-(4-chloro-phenyl)-4-methylmercapto-2-phenyl-quinazolinium iodide. | 2-methyl-benzothiazole methiodide | 1-(4-chloro-phenyl)-4-(3-methyl-2-benzothiazolylidene-methyl)-2-phenyl-quinazolinium iodide. |
| 2-methyl-4-methylmercapto-1-phenyl-quinazolinium iodide. | 2-picoline methiodide | 2-methyl-4-(1-methyl-2-pyridylidene-methyl)-1-phenyl-quinazolinium iodide. |
| 2-ethyl-4-methyl-mercapto-1-(4-methyl-phenyl)-quinazolinium iodide. | 4-picoline methiodide | 2-ethyl-1-(4-methyl-phenyl)-4-(1-methyl-4-pyridylidene-methyl)-quinazolinium idolde. |
| 2-benzyl-4-methylmercapto-1-(3-trifluoromethyl-phenyl)-quinazolinium iodide. | 2-methyl-benzothiazole methiodide | 2-benzyl-4-(3-methyl-2-benzothiazolylidene-methyl)-1-(3-trifluoromethyl-phenyl)-quinazolinium iodide. |
| 4-ethylmercapto-1,2-diphenyl-6-methoxy-quinazolinium iodide. | 6-methoxy-2-quinaldine ethiodide | 1,2-diphenyl-4-(1-ethyl-6-methoxy-2-quinolylidene-methyl)-6-methoxy-quinazolinium iodide. |
| 1,2-diphenyl-6-methyl-4-methyl-mercapto-quinazolinium iodide. | 2-methyl-thiazole methiodide | 1,2-diphenyl-6-methyl-4-(3-methyl-2-thiazolylidene-methyl)-quinazolinium iodide. |
| 6-chloro-1,2-diphenyl-4-methyl-mercapto-quinazolinium iodide. | 1-methyl-isoquinoline methiodide | 6-chloro-1,2-diphenyl-4-(2-methyl-1-isoquinolylidene-methyl)-quinazolinium iodide. |
| 1-(3,4-dichloro-phenyl)-4-methyl-mercapto-2-(4-methyl-phenyl)-quinazolinium iodide. | 7-chloro-2-quinaldine methiodide | 4-(7-chloro-1-methyl-2-quinolylidene-methyl)-1-(3,4-dichloro-phenyl)-2-(4-methyl-phenyl)-quinazolinium iodide. |
| 4-benzylmercapto-1-(4-bromo-phenyl)-2-isopropyl-quinazolinium iodide. | 2-methyl-benzoxazole methiodide | 1-(4-bromo-phenyl)-2-isopropyl-4-(3-methyl-2-benzoxazolylidene-methyl)-quinazolinium iodide. |
| 4(methylmercapto-2-(3-nitro-phenyl)-1-phenyl-quinazolinium iodide. | 2-methyl-oxazole methiodide | 4-(3-methyl-2-oxazolylidene-methyl)-2-(3-nitro-phenyl)-1-phenyl-quinazolinium iodide. |
| 2-(4-bromo-phenyl)-4-methylmercapto-1-phenyl-quinazolinium iodide. | 2,3,3-trimethyl-indolenine methiodide | 2-(4-bromo-phenyl)-1-phenyl-4-(1,3,3-trimethyl-2-indolylidene-methyl)-quinazolinium iodide. |
| 4-methylmercapto-2-(4-methyl-phenyl)-1-phenyl-quinazolinium iodide. | 2-quinaldine ethiodide | 4-(1-ethyl-2-quinolylidine-methyl)-2-(4-methyl-phenyl)-1-phenyl-quinazolinium iodide. |
| 2-(4-methoxy-phenyl)-4-methylmercapto-1-(2-naphthyl)-quinazolinium iodide. | 2-methyl-benzothiazole methiodide | 2-(4-methoxy-phenyl)-4-(3-methyl-2-benzothiazolylidene-methyl)-1-(2-naphthyl)-quinazolinium iodide. |
| 4-ethylmercapto-2-(4-methylmercapto-phenyl)-1-phenyl-quinazolinium iodide. | 2-quinaldine methiodide | 2-(4-methylmercapto-phenyl)-4-(1-methyl-2-quinolylidene-methyl)-1-phenyl-quinazolinium iodide. |
| 2-methyl-4-methyl-mercapto-1-phenyl-quinazolinium iodide. | 2-quinaldine ethiodide | 4-(1-ethyl-2-quinolylidene-methyl)-2-methyl-1-phenyl-quinazolinium iodide. |

Example 8

Through the deep red solution of 0.7 g. of 1-(4-fluoro-phenyl)-4-methylmercapto - 2 - phenyl-quinazolinium iodide in 15 ml. of dimethylformamide, methylamine is bubbled until the color changes to pale yellow. After standing at room temperature for 15 minutes water is added until no more precipitate is formed. The latter is filtered off and recrystallized once from diethyl ether to yield the 1-(4-fluoro-phenyl)-4-methylimino-2-phenyl-1,4-dihydro-quinazoline of the formula

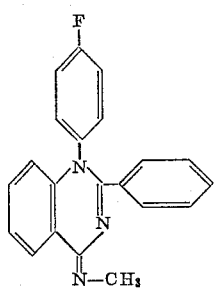

melting at 228–230°.

By using ammonia, ethylamine or dimethylamine instead of methylamine the 1-(4-fluoro-phenyl)-4-imino-2-phenyl-1,4-dihydro-quinazoline, 1-(4 - fluoro-phenyl)-4-ethylimino-2-phenyl-1,4-dihydro-quinazoline and 1 - (4-fluoro-phenyl)-4-dimethylamino-2-phenyl - quinazolinium iodide of the formula

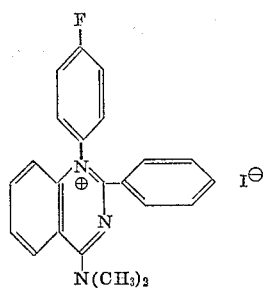

are obtained.

Example 9

The mixture of 0.25 g. of 1-(4-fluoro-phenyl)-4-methylmercapto-2-phenyl-quinazolinium iodide and 1.0 ml. of 2-dimethylamino-ethylamine is allowed to stand at room temperature until the orange color disappears and the gas evolution ceases. After about 10 minutes water is added, the precipitate formed is filtered off and recrystallized once from diethyl ether-pentane with the use of charcoal. There is obtained the 1-(4-fluoro-phenyl)-4-(2-dimethylamino-ethylimino)-2-phenyl-1,4 - dihydro-quinazoline of the formula melting at 181–183°.

In the analogous manner the 1-(4-fluoro-phenyl)-4-(2-methylamino-ethylimino)-2 - phenyl-1,4-dihydro-quinazoline and the 1-(4-fluoro-phenyl)-4-(2-amino-ethylimino)-2-phenyl-1,4-dihydroquinazoline are prepared.

Example 10

0.5 g. of 1-(4-fluoro-phenyl) - 4 - methylmercapto-2-phenyl-quinazolinium iodide and 1.5 g. of N-(2-aminoethyl)-N'-phenyl-piperazine are mixed together and the mixture is molten on a steam bath, during which methylmercaptan is given off and the orange color disappears. After about 15 minutes water is added and the white solid filtered off. It is recrystallized once from acetone and yields the 1-(4-fluoro-phenyl)-4-[2-(4-phenyl-piperazino)-ethylimino]-2-phenyl-1,4-dihydro - quinazoline of the formula

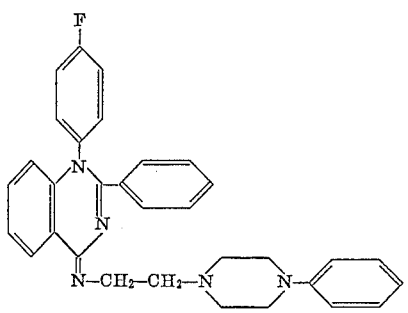

mleting at 244–246° with decomposition.

Using glycine or its methylester, instead of the piperazine compound, the 1-(4 - fluoro-phenyl)-4-(carboxymethylimino)-2-phenyl-1,4-dihydro - quinazoline of the formula

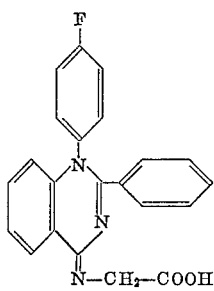

or its methylester can be prepared.

Example 11

Ammonia is bubbled through the dark red solution of 2.2 g. of 1-(4-fluoro-phenyl)-2-phenyl-4-methylmercapto-quinazolinium iodide in 40 ml. of dimethylformamide, causing a rapid color change to pale yellow. Bubbling is continued for another 5 minutes, then the mixture is allowed to stand for 15 minutes. It is filtered through sintered glass to remove a trace of insoluble matter, then water is added to the filtrate causing a pale yellow-white solid to precipitate. This is filtered off, air-dried and recrystallized 3 times from acetone-diethyl ether to yield the 1-(4-fluoro-phenyl)-4-imino-2-phenyl-1,4-dihydro-quinazoline of the formula.

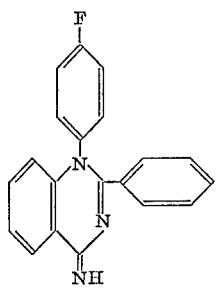

melting at 243–245°.

Example 12

Monoethylamine is bubbled through the dark red solution of 1.5 g. of 1-(4-fluoro-phenyl)-2-phenyl-4-methylmercapto-quinazolinium iodide in 30 ml. of dimethyl formamide, causing a rapid color change to pale yellow. Bubbling is continued for 5 minutes, then the solution is allowed to stand for 15 minutes. Water is added until no more precipitate appears. The white solid precipitate is filtered off and recrystallized from acetonediethyl ether to yield the 1-(4-fluoro-phenyl)-4-ethylimino-2-phenyl-1,4-dihydroquinazoline of the formula

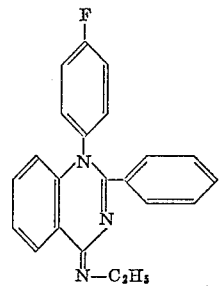

melting at 234–236°.

Example 13

To a solution of 2.0 g. 1-(4-fluoro-phenyl)-4-methylmercapto-2-phenyl-quinazolinium iodide in 20 ml. dimethyl formamide, 0.75 g. n-propylamine are dropped in while stirring. After standing for 15 minutes at room temperature, excess water is added to the mixture, the white precipitate formed is filtered off, dried and recrystallized from acetone to yield the 1-(4-fluoro-phenyl)-4-n-propylamino-2-phenyl - 1,4 - dihydro-quinazoline of the formula

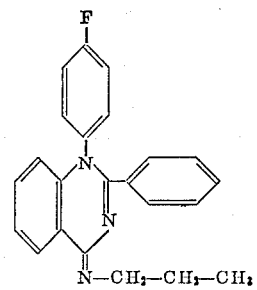

melting at 234–235°.

Example 14

In the analogous manner described in the previous example the following compounds can be prepared using the equivalent amount of the corresponding starting materials:

| Compound | M.P., deg. | Recrystallized from— |
| --- | --- | --- |
| 4-i-propylimino-1-(4-fluoro-phenyl)-2-phenyl-1,4-dihydro-quinazoline. | 217–219 | Diethyl ether. |
| 4-n-butylimino-1-(4-fluoro-phenyl)-2-phenyl-1,4-dihydro-quinazoline. | 195–197 | Acetone. |
| 4-(2-butyl)-imino-1-(4-fluorophenyl)-2-phenyl-1,4-dihydroquinazoline. | 190–198 | Methanol. |
| 4-(2-methyl-propyl)-imino-1-(4-fluoro-phenyl)-2-phenyl-1,4-dihydro-quinoline. | 204–213 | Do. |
| 4-n-pentylimino-1-(4-fluoro-phenyl)-2-phenyl-1,4-dihydro-quinazoline. | 182–184 | Acetone. |

Example 15

0.5 g. 1 - (4-fluoro-phenyl)-2-phenyl-4-n-propylimino-1,4,5,6,7,8-hexahydro-quinazoline are dissolved in 100 ml. cyclohexane, to the solution 0.1 g. 10% palladium-charcoal are added and the mixture is refluxed for 24 hours. Hereupon the catalyst is filtered off, the filtrate evaporated under reduced pressure and the residue recrystallized from acetone using charcoal for decolorization to yield the 1-(4 - fluoro - phenyl) - 4 - n-propylimino-2-phenyl-1,4-dihydro-quinazoline which is identical with that obtained according to Example 13.

Example 16

0.5 g. of 1 - (4 - fluoro - phenyl) - 2-phenyl-4-n-propylimino - 1,4,5,6,7,8 - hexahydro-quinazoline and 0.2 g. sulfur are dissolved in the minimum amount of dimethylformamide necessary for dissolution, the whole is refluxed for 30 minutes, then the mixture is evaporated under reduced pressure, the residue is dissolved in acetone, the solution filtered, the filtrate concentrated and kept in the cool to yield the crystalline 1 - (4 - fluorophenyl) - 4 - n - propylimino - 2 - phenyl-1,4-dihydroquinazoline which is identical with that obtained according to Example 13.

What is claimed is:

1. A member selected from the group consisting of the compound having the formula

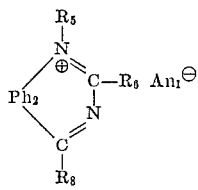

in which $Ph_2$ stands for a member selected from the group consisting of 1,2-phenylene, (lower alkyl) - 1,2-phenylene, (lower alkoxy) - 1,2 - phenylene, (halogeno)-1,2 - phenylene, (lower alkylmercapto) - 1,2 - phenylene and (nitro) - 1,2 - phenylene, $R_5$ for a member selected from the group consisting of phenyl, (lower alkyl)-phenyl (lower alkoxy) - phenyl, (halogeno) - phenyl, (lower alkylmercapto) - phenyl and (nitro) - phenyl, $R_6$ for a member selected from the group consisting of lower alkyl, phenyl, (lower alkyl) - phenyl, (lower alkoxy) - phenyl, (halogeno) - phenyl, (lower alkylmercapto)-phenyl and (nitro) - phenyl, $R_8$ for lower alkylmercapto, and $An^\ominus$ for a halogenide ion.

2. A compound as claimed in claim 1, in which formula $Ph_2$ stands for 1,2 - phenylene, $R_5$ for a member selected from the group consisting of phenyl, (lower alkyl) - phenyl, (lower alkoxy) - phenyl and (halogeno)-phenyl, $R_6$ for a member selected from the group consisting of lower alkyl, phenyl, (lower alkyl) - phenyl, (lower alkoxy) - phenyl and (halogeno) - phenyl, $R_8$ for lower alkylmercapto, and $An^\ominus$ for a halogenide ion.

3. 1 - (4 - fluoro - phenyl) - 4 - methylmercapto-2-phenyl-quinazolinium iodide.

4. 1,2 - diphenyl - 4 - methylmercapto-quinazolinium iodide.

5. 1 - phenyl - 2 - methyl - 4 - methylmercapto-quinazolinium iodide.

6. 1 - (4 - methoxy - phenyl) - 4-methylmercapto-2-phenyl-quinazolinium iodide.

References Cited

UNITED STATES PATENTS

| 2,495,260 | 1/1950 | Jennen et al. | 260—240.6 |
| 2,715,623 | 8/1955 | Fry et al. | 260—240.6 |
| 2,895,957 | 7/1959 | Jeffreys et al. | 260—240.6 |

OTHER REFERENCES

Fry et al.: J. Chem. Soc. 1960, 5062–5072.

Carney et al.: J. Org. Chem., vol. 29, pp. 2887–2889 (October 1964).

Huang-Hsinmin et al.: J. Chem. Soc. 1949 pp. 2905–2906 and 2911.

De Stevens et al.: Amer. Chem. Soc. Absts. of Papers, 145th meeting, pp. 59Q–60Q (Aug. 27, 1963).

JOHN D. RANDOLPH, *Primary Examiner.*